United States Patent

Ochiai et al.

[11] Patent Number: 6,021,295
[45] Date of Patent: Feb. 1, 2000

[54] DEVELOPING APPARATUS

[75] Inventors: Eiji Ochiai; Shigeki Tsukahara; Makoto Hamaguchi; Naoki Date, all of Watarai-gun, Japan

[73] Assignee: Kyocera Corporation, Kyoto, Japan

[21] Appl. No.: 09/086,076

[22] Filed: May 28, 1998

[30] Foreign Application Priority Data

May 30, 1997 [JP] Japan ................................ 9-157867

[51] Int. Cl.$^7$ ................................................. G03G 15/09
[52] U.S. Cl. ............................................ 399/275; 399/277
[58] Field of Search .................................... 399/277, 276, 399/275, 265

[56] References Cited

U.S. PATENT DOCUMENTS

| | | | |
|---|---|---|---|
| 4,386,577 | 6/1983 | Hosono et al. | 118/657 |
| 4,660,505 | 4/1987 | Goto et al. | 118/689 |
| 4,743,942 | 5/1988 | Yamamoto et al. | 399/275 |
| 5,655,191 | 8/1997 | Furuya et al. | 399/231 |

*Primary Examiner*—Arthur T. Grimley
*Assistant Examiner*—Greg Moldafsky
*Attorney, Agent, or Firm*—Loeb & Loeb LLP

[57] ABSTRACT

A developing apparatus employing a three-pole stationary magnetic roller for use with a uni-component magnetic developer or toner. The apparatus includes a rotational sleeve which accommodates the stationary roller, a mixer disposed in a toner vessel for stirring the toner, and a toner layer thickness regulator disposed upstream in the sleeve rotation direction from the developing position at which the image on a photo-sensitive drum is developed. The magnetic roller has a developing pole located near the developing position, a blade-facing pole facing the toner layer thickness regulator, and a shield pole located downstream in the sleeve rotation direction from the developing position, where the blade-facing pole and the shield pole are of the opposite polarity to the developing pole. The blade-facing pole and the shield pole generate a repulsive magnetic field therebetween, where the toner that has been stirred in the vessel comes in contact with the sleeve.

6 Claims, 5 Drawing Sheets

Fig. 5

| No. | Interpolar angle between the same polarity pole [°] | Blade-facing pole | | | Toner layer formation | Image density | |
|---|---|---|---|---|---|---|---|
| | | Full-wave width at half maximum [°] | Magnetic flux density [G] | Pole position angle [°] | | Initial | After printing of 100 k prints |
| 1 | 90 | 60 | 750 | +10 | ○ | 1.38 | 1.08 |
| 2 | 120 | 60 | 750 | +10 | ○ | 1.38 | 1.33 |
| 3 | 140 | 55 | 750 | +10 | ○ | 1.38 | 1.33 |
| 4 | 170 | 55 | 750 | +10 | ○ | 1.39 | 1.33 |
| 5 | 120 | 55 | 500 | +10 | × | — | — |
| 6 | 120 | 55 | 650 | +10 | ○ | — | — |
| 7 | 120 | 55 | 900 | +10 | × | — | — |
| 8 | 120 | 30 | 750 | +10 | × | — | — |
| 9 | 120 | 40 | 800 | +10 | × | — | — |
| 10 | 120 | 60 | 750 | 0 | ○ | — | — |
| 11 | 120 | 60 | 750 | +5 | × | — | — |
| 12 | 120 | 60 | 750 | +7 | ○ | — | — |
| 13 | 120 | 60 | 750 | +13 | ○ | — | — |
| 14 | 120 | 60 | 750 | +16 | × | — | — |
| 15 | 120 | 60 | 750 | −10 | × | — | — |
| 16 | 120 | 60 | 750 | −20 | × | — | — |
| 17 | 120 | 50 | 750 | +10 | ○ | — | — |

Note 1  The symbols in the toner layer formation column represent the following: ○: Satisfactory, ×: Unsatisfactory. The satisfactory thin toner layer formation is such that the toner layer thickness is 140 ± 20 μm.

Note 2  The pole position angle is + (plus) when the blade-facing pole is upstream the blade position and − (minus) when the former is downstream the latter.

DEVELOPING APPARATUS

BACKGROUND OF THE INVENTION

1. Field of the Invention

The present invention relates to a developing apparatus for carrying out electrophotographic development used with a uni-component magnetic developer (or toner) and, more particularly, to a developing apparatus using, as toner carrier, a rotational sleeve accommodating a stationary magnet roller having a plurality of magnetic poles.

2. Related Art

A well-known developing apparatus uses a rotational sleeve accommodating a stationary magnet roller having a plurality of magnetic poles as toner carrier. In this developing apparatus, toner charged into and collected in a developer vessel is caused to be carried by utilizing magnetic carrying forces produced on the rotational sleeve, and the layer thickness is regulated by utilizing a toner layer thickness regulator called doctor blade, then the regulated toner layer being led to a developing position.

FIG. 3 shows the pole configuration structure of a stationary magnet roller 10, which is used as related art to the above well-known apparatus. The illustrated stationary magnet roller 10 has a four-pole structure constituted by:

- a developing pole N1 facing a developing position;
- a shield pole S1 facing the inner surface of a wall 20a constituting a toner vessel bottom, which shields, via a predetermined gap, a portion of the outer periphery of a rotational sleeve 11 that is found downstream the developing pole N1 in the sleeve rotation direction; (as indicated by the arrow C)
- a blade-facing pole S2 facing a doctor blade for toner layer thickness restriction; and
- a carrier pole N2 located between the shield pole S1 and the blade-facing pole S2.

FIG. 4 shows a different example of stationary magnet roller 10, which has a five-pole structure having separate poles N2 and N3 located adjacent to each other and having the same polarity as and replacing the pole N2 shown in FIG. 3.

The above four-pole structure can find extensive applications to a commonly termed flying developing system using a uni-component magnetic toner. This structure, however, has such a drawback that it may sometimes fail to sufficiently stir and mix both return toner returning from the developing position, at which an image on a photo-sensitive drum A is developed, and fresh toner on the side of a toner vessel 20.

In the above five-pole structure which has the separate poles N2 and N3 located one adjacent to the other to utilize a repulsive magnetic field thereof, the inter-polar angle between the separate poles N2 and N3 is small. Therefore, although no problem arises where a two-component developer is used because of the fluidity of the toner is satisfactory in this case, in case of a developing apparatus used with a uni-component developer, the fluidity of toner is unsatisfactory, and also the bulk density of the developer is low, so that the separation performance is unsatisfactory.

The above drawbacks are increased the smaller the diameter of the stationary magnet roller 10, eventually making it impossible to effectively use the four- or five-pole structure.

OBJECT AND SUMMARY OF THE INVENTION

The present invention was made in view of the above problems inherent in the prior art, and it has an object of providing a durable developing apparatus, which uses a uni-component toner and has improved performance of separation of toner from a developing sleeve (or rotational sleeve).

A developing apparatus provided according to the present invention as illustrated in FIG. 1 and FIG. 2 comprises:

- a mixer 22 for stirring toner as uni-component magnetic developer;
- a rotational sleeve 11 accommodating a stationary magnet roller having a plurality of magnetic poles; and
- a toner layer thickness regulator 13 disposed upstream a developing position, at which image on a photo-sensitive drum A is developed, in the sleeve rotation direction;
  - toner having been carried on the rotational sleeve 11 by utilizing the magnetic forces of the stationary magnet roller 10 being layer thickness regulated by the toner layer thickness regulator 13 before being led to the developing position.

The stationary magnet roller 10 has a three-pole structure constituted by:

- a developing pole N1 located near the developing position and facing the photo-sensitive drum A;
- a blade-facing pole S2 which is one of two separate poles of the opposite polarity to the developing pole N1 and facing the toner layer thickness regulator 13; and
- a shield pole S1 which is the other one of the two separate poles and located downstream the developing position in the sleeve rotation direction.

Thus, toner having been stirred in a developer vessel can be in contact with a part of the rotational sleeve between the two separate poles.

With the above three-pole structure according to the present invention, it is possible to set a large peripheral distance of a part of the rotational sleeve 11 between the two poles S1 and S2. Also, since a repulsive magnetic field is set up on that part of the rotational sleeve 11, toner returned from the developing position without being used for development is torn off from the sleeve surface, and fresh toner is attached thereto and layer thickness regulated by the downstream toner layer thickness regulator 13.

BRIEF DESCRIPTION OF THE DRAWINGS

FIG. 5 is a graph showing experimental data.

DETAILED DESCRIPTION OF THE PREFERRED EMBODIMENT

A preferred embodiment of the present invention will now be described in detail exemplarily with reference to the drawings. It is to be construed that, unless particularly described otherwise, the sizes, materials, shapes, relative dispositions, etc., of components described in connection with the embodiment have no sense of limiting the scope of the present invention but are merely exemplary.

Figure 1:
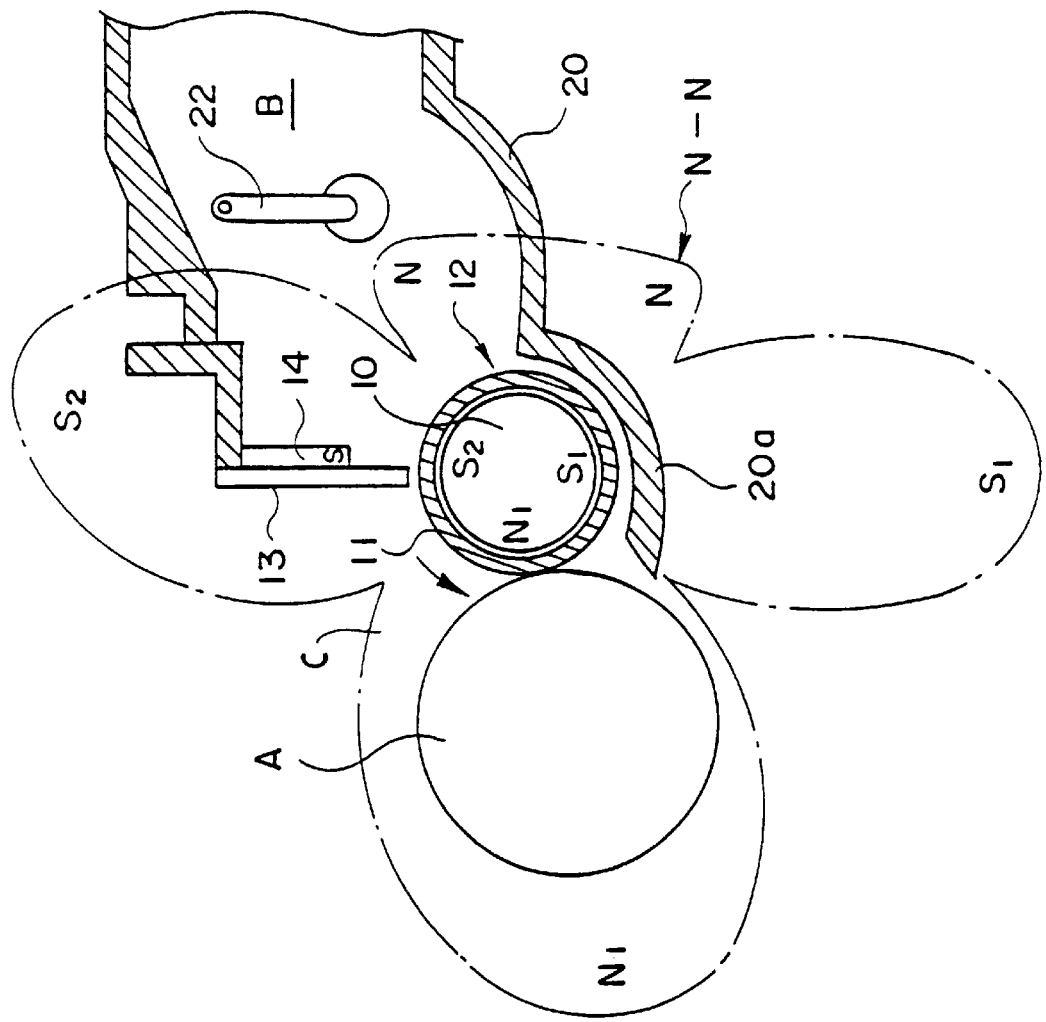
FIG. 1 is a view showing an essential part of a developing roller section shown in FIG. 2, according a stationary magnet roller having a three-pole structure.
Figure 2:
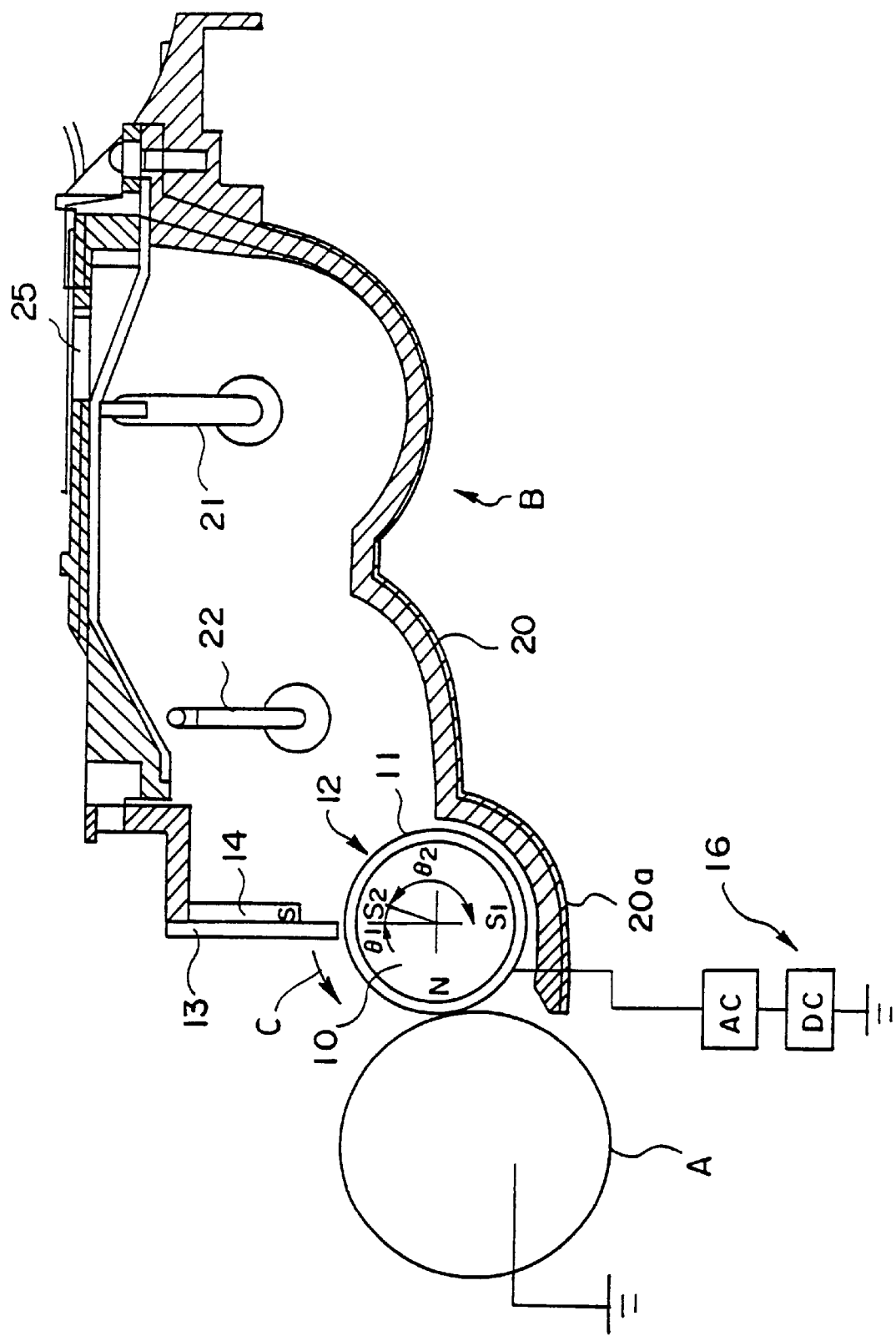
FIG. 2 is a sectional view showing an embodiment of the developing apparatus used with a uni-component magnetic developer according to the present invention.
Figure 3:
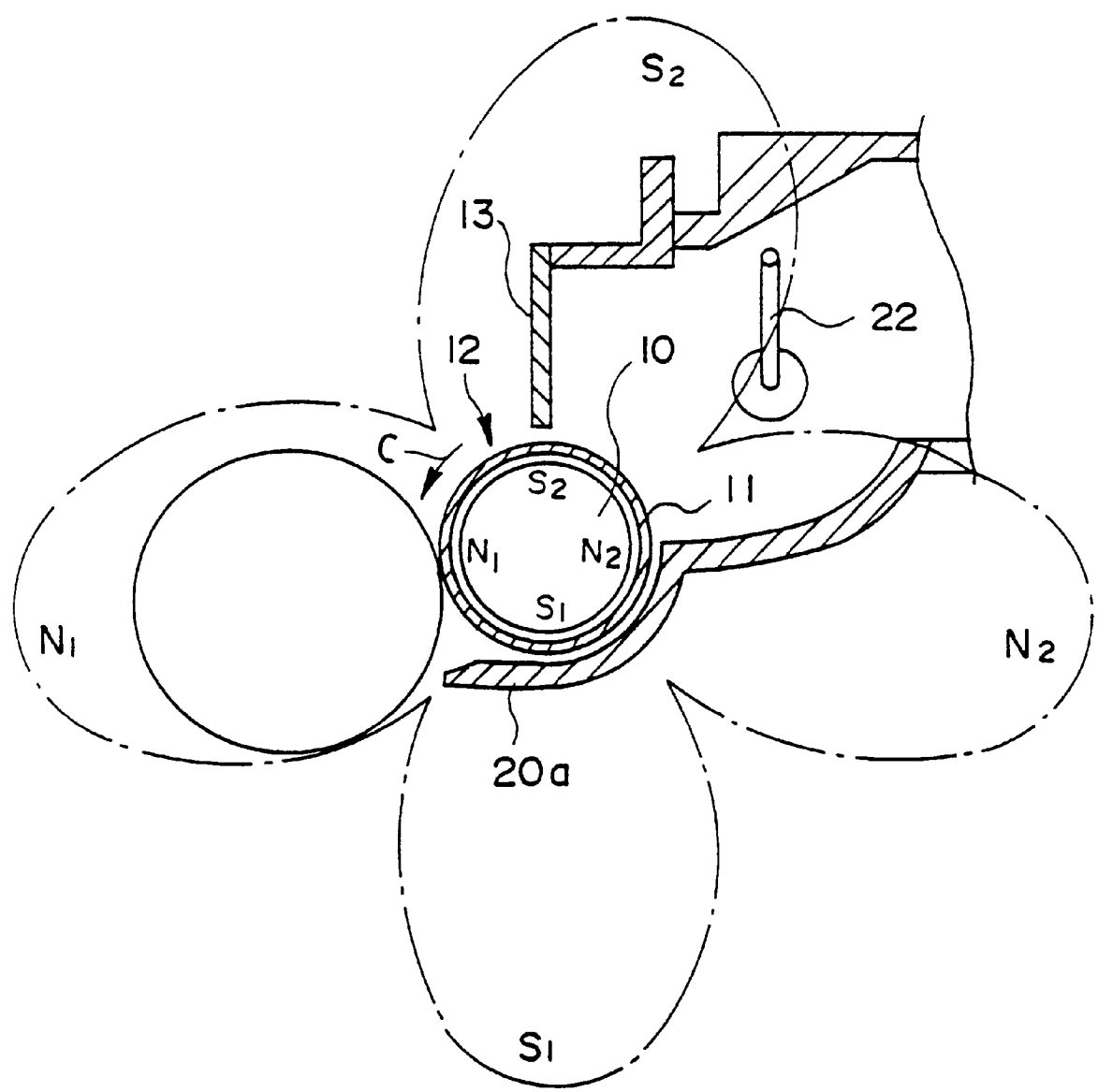
FIG. 3 is a view showing an essential part of a related art developing roller section accommodating a stationary magnet roller having a four-pole structure.
Figure 4:
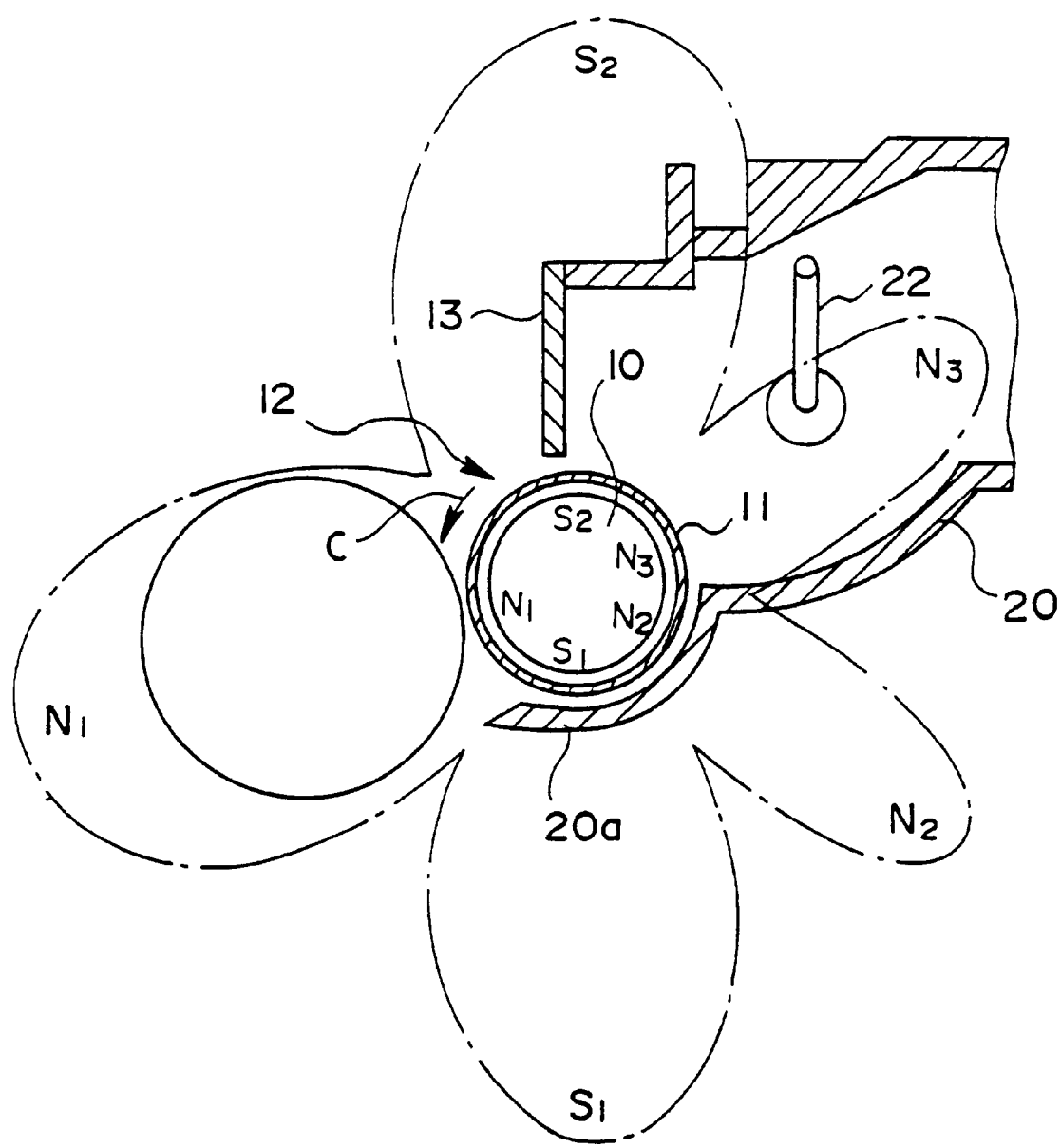
FIG. 4 is a view showing an essential part of a related art developing roller section accommodating a stationary magnet roller having a five-pole structure.

FIGS. 1 and 2 illustrate the sectional structure of an embodiment of the developing apparatus used with a uni-component magnetic developer according to the present invention. FIG. 1 shows an essential part of the developing roller section, and FIG. 2 shows the entire developing roller section.

Referring to the Figures, designated at A is a photo-sensitive drum, and B a developing apparatus.

The developing apparatus B comprises:

a pair of mixers 21 and 22 disposed in a developer vessel 20 accommodating a uni-component developer or toner;

a developing roller (i.e., a toner carrier roller) 12 constituted by a rotational non-magnetic sleeve 11, which is disposed in the developer vessel 20 adjacent to the photo-sensitive drum A and accommodates a stationary magnet roller 10 having a plurality of poles:

a magnetic blade 13 hanging down from above and toward the developing roller 12 and to the surface of the developing roller 12.

A magnet 14 mounted on the surface of the magnetic blade 13 on the side wall of the developer vessel 20 and having an S pole formed at the lower end; and a developing bias 16 applied between the developing roller 12 and the photo-sensitive drum A.

The developer vessel 20 has a toner replenishment hole 25 formed in its top wall at a position thereof above the mixer 21. Toner can be charged from a toner container (not shown), through the toner replenishment hole 25. The charged toner is sufficiently stirred by the pair of mixers 21 and 22, and then led to the rotational sleeve 11.

The outer periphery of the rotational sleeve 11 and the developer vessel 20 are related to each other such that the developer vessel 20 is open to expose the outer periphery of the rotational sleeve 11 by about 90 degrees upstream the magnetic blade 13 facing the mixer 22, and a wall 20a constituting a developer vessel bottom shields a lower part of the outer periphery of the rotational sleeve 11 via a predetermined gap.

The magnetic blade 13 is set such that it is spaced apart by a gap of 0.3 mm from the rotational sleeve 11.

The developing bias 16 is a low electric field developing bias constituted by superimposed DC and AC (VDC 160 V, VPP 1.8 kV), and image density control is made by controlling the oscillating frequency of the AC.

When making no development, opposite polarity toner is removed by turning off DC and holding sole AC "on".

The photo-sensitive drum A is a thin film silicon drum with a photo-conductive layer thickness of 4 to 25 $\mu$m. The diameter of the photo-sensitive drum A is set to 30 mm$\phi$, and the diameter of the rotational sleeve 11 is set to 20 mm$\phi$.

The pole configuration structure of the stationary magnet roller 10 will now be described with reference to FIG. 1.

The pole configuration structure comprises:

a developing pole N1 which is N pole located near a developing position, at which image on the photo-sensitive drum A is developed;

a shield pole S1 which is S pole facing the inner surface of a developer vessel wall 20a located downstream the developing pole N1 in the direction of rotation of the rotary sleeve 11; (as indicated by the arrow C) and a blade-facing pole S2 which is S pole facing the doctor blade (i.e., magnetic blade) 13 located upstream the developing pole N1 in the direction of rotation of the rotational sleeve 11.

The developing pole N1 provides a magnetic flux density of 900 G and is located at a declination angle of about 15 degrees on the upstream side of the direction of rotation of the rotary sleeve 11 with respect to the position of the developing magnetic gap (i.e., the position at which the rotational sleeve 11 is closest to the photo-sensitive drum A).

With the position of the developing pole N1 set to be a reference position (i.e., 0 degree), the magnetic blade 13 is set at a rotational angle of 270 degrees downstream (i.e., 90 degrees upstream) in the direction of rotation of the rotational sleeve 11.

The outer periphery of the rotational sleeve 11 is exposed for a range of 180 to 270 degrees (i.e., 90 to 180 degrees upstream) between the magnetic blade 13 and the developer vessel wall 20a, at which faces the mixers 21 and 22 in the developer vessel 20.

Experiments were conducted with the above structure by setting the magnetic flux density of the shield pole S1 to 750 G and the full-width at half maximum to 57 degrees and setting various values of:

the interpolar angle between the shield and blade-facing poles S1 and S2;

the declination angle of the blade-facing pole S2 with respect to the magnetic blade 13; and the magnetic flux density of the blade-facing pole S2 and the full-width at half maximum of that magnetic flux density;

to confirm how the toner layer is formed (Experiments No. 1 to 17) and how the image density is reduced after making durability printing of 100 k (i.e., 100, 000) prints. FIG. 5 shows the obtained data.

As the results of the experiments as shown in FIG. 5, in Experiment No. 1 in which the interpolar angle between the two poles of the same polarity was set to 90 degrees, the image density after producing 100 k prints was 1.08.

In Experiments No. 2 to 4 in which the interpolar angle was set to substantially 100 to 180 degrees, suitably substantially 120 to 170 degrees, the image density after producing 100 k prints was 1.33, indicating a very slight image density reduction.

It is a requirement of this embodiment to set the magnetic flux density of the developing pole N1 to be higher than or equal to the magnetic flux density of the two other poles S1 and S2.

Particularly, as is obvious from the experimental data of Experiments No. 2 and 5 to 7 which are conducted for various values of the magnetic flux density of the blade-facing pole S2, the magnetic flux density of the rotational sleeve is suitably set to 750 to 900 G.

Experiment data of Experiments No. 2 and 10 to 16 which were conducted with the blade-facing pole S2 set at declination angles with respect to the magnetic blade, show that satisfactory thin toner layer formation with the toner layer thickness in a range of 140±20 $\mu$m could be obtained in Experiments No. 2, 12 and 13. It will thus be seen that the blade-facing pole S2 is suitably set at declination angle of +6 to +15 degrees, preferably +7 to +13 degrees, upstream the magnetic blade in the rotational sleeve rotation direction.

In this embodiment in which the magnet 14 with the S pole formed at the lower end is mounted on the surface of the magnetic blade 13 facing the developer vessel 20, the above effect can be more smoothly attained by setting up a repulsive magnetic field between the magnetic blade and the blade-facing pole S2.

Experiment data of Experiments No. 2, 8, 9 and 17 which were conducted by setting various values of the full-width at half maximum of the blade-facing pole S2 with respect to the peak of the magnetic flux density, show that thin toner layer formation with satisfactory toner layer thickness could be obtained in Experiments No. 2, 12 and 17 in which the full-width at half maximum was set to 50 degrees or above.

FIG. 1 shows the magnetic field distribution obtained in Experiment No. 2. It will be seen that a repulsive magnetic field, i.e., horizontal magnetic field N—N, is formed on a part of the rotational sleeve 11 between the two poles S1 and S2. The magnetic flux intensity was 130 to 140 G on the side of the pole S1 and 160 to 190 G on the side of the pole S2.

As has been described in detail, in the above embodiment:
the diameter of the rotational sleeve 11 is set to 10 to 30 mm$\phi$, preferably 20 mm$\phi$;
the stationary magnet roller 10 is formed such as to have a three-pole structure constituted by the developing pole N1 located near the developing position, and the other two poles S1 and S2 of the opposite polarity to the developing pole N1; and
a part of the rotational sleeve 11 between the two poles S1 and S2 can be in contact with fresh toner having been stirred by the mixer 22 in the developer vessel 20.

The three-pole structure has an advantage that it is possible to set a large peripheral distance of the part of the rotational sleeve 11 between the two poles S1 and S2 even in the case when the diameter of the rotational sleeve 11 is set to be as small as 30$\phi$ mm or below. In addition, since the repulsive magnetic field is set up on the peripheral surface of the rotational sleeve 11, toner having been returned without being used for development is torn off from the sleeve surface, and fresh toner is attached thereto and layer thickness is regulated by the downstream side toner layer thickness regulator 13.

The lower limit of the diameter of the rotational sleeve 11 is set to 10 mm$\phi$, because with a smaller diameter it is difficult to obtain an effective pole configuration.

In the above embodiment, the stationary magnet roller 10 is formed such as to have a three-pole structure constituted by the developing pole N1 located near the developing position, and the other two poles S1 and S2 of the opposite polarity to the developing pole N1, and further, a repulsive magnetic field, i.e., horizontal magnetic field N—N is formed on a part of the rotational sleeve 11 between the two poles S1 and S2, whereby a part of the rotational sleeve 11 between the two poles S1 and S2 can be in contact with toner having been stirred by the mixer in the developer vessel 20.

In this way, it is possible to set a large peripheral distance on the part of the rotational sleeve 11 between the two poles S1 and S2. In addition, since the repulsive magnetic field based on the two poles S1 and S2, i.e., horizontal magnetic field having the opposite polarity, is set up on the peripheral surface of the rotational sleeve 11, the return toner is smoothly torn off the sleeve surface and fresh toner attached thereto.

In the above embodiment, the two poles S1 and S2 are located in the developer vessel 20 at predetermined positions in an angular range from the developing pole N1 to the toner layer thickness regulator 13 in the sleeve rotation direction, and the interpolar angle between the two magnetic poles S1 and S2 is set to substantially 100 to 180 degrees, preferably substantially 120 to 170 degrees.

It was confirmed by experiments that with the above structure the image density is not reduced even after making continuous printing of 100 k (i.e., 100,000) prints.

In the above embodiment, the magnetic flux density of the developing pole N1 is set to be higher than that of the other two magnetic poles S1 and S2, and preferably the magnetic flux density thereof is set to 750 G or above.

It is thus possible to smoothly obtain loosening and flying developing of toner at the developing position and form a stable thin layer of toner on the rotational sleeve.

In the above embodiment, the blade-facing pole S2 as one of the two poles S1 and S2 is located at position such that it faces the toner layer thickness regulator 13 and at a declination angle of 6 to 15 degrees upstream in the sleeve rotation direction to the toner layer thickness regulator 13.

It is thus possible to form a stable thin layer of toner on the rotational sleeve.

In the above embodiment, the toner layer thickness regulator 13 is constituted by a magnetic blade, and a magnetic force of the same polarity as the blade-facing pole S2 is applied to the magnetic blade.

Thus, the repulsive magnetic field is set up between the magnetic blade 13 and the blade-facing pole S2, permitting toner to be magnetically floated up and cutting magnetic brush at the position of the magnetic blade. It is thus possible to form a stable thin layer of toner on the sleeve and extend the life of the image density.

In the above embodiment, the suitable horizontal magnetic field as noted above can be formed by setting the full-wave width at half maximum of the blade-facing pole S2 with respect to the magnetic flux density peak thereof to 50 degrees or above.

Moreover in the above embodiment, the inner developer vessel bottom surface of the developer vessel wall 20a shields, by a predetermined gap, a part of the peripheral surface of the rotational sleeve 11 located downstream the developing pole N1 in the sleeve rotation direction, and the shield pole as the other one of the two poles S1 and S2 is located such that it faces the inner developer vessel bottom surface. Thus, the shield pole S1, as is suitable, can magnetically blockade a space between the developer vessel 20 and the rotational sleeve 11 with respect to each other.

As has been described in the foregoing, according to the present invention it is possible to improve the performance of toner separation from the developing sleeve and provide a durable developing apparatus used with a uni-component developer.

We claim:

1. A developing apparatus comprising:
   a developer vessel for containing a toner as a uni-component magnetic developer;
   a mixer disposed in the vessel for stirring the toner;
   a rotational sleeve accommodating a stationary magnet roller having a plurality of magnetic poles; and
   a toner layer thickness regulator disposed upstream of a developing position at which an image on a photo-sensitive drum is developed, in the sleeve rotation direction;
   wherein the toner is carried on the rotational sleeve by utilizing magnetic forces of the stationary magnet roller and layer thickness regulated by the toner layer thickness regulator before being led to the developing position;
   wherein the stationary magnet roller has a three-pole structure constituted by:
      a developing pole located near the developing position and facing the photo-sensitive drum; and
      two poles of the opposite polarity to the developing pole, one of the two poles being a blade-facing pole facing the toner layer thickness regulator, the other one of the two poles being a shield pole located downstream of the developing position in the sleeve rotation direction; and wherein the toner having been stirred in the developer vessel is brought in contact with a part of the rotational sleeve between the blade-facing pole and the shield pole;

wherein the magnetic flux density of the developing pole is higher than or equal to the magnetic flux density of each of the blade-facing pole and the shield pole.

2. A developing apparatus comprising:

a developer vessel for containing a toner as a uni-component magnetic developer;

a mixer disposed in the vessel for stirring the toner;

a rotational sleeve accommodating a stationary magnet roller having a plurality of magnetic poles; and a toner layer thickness regulator disposed upstream of a developing position at which an image on a photo-sensitive drum is developed in the sleeve rotation direction;

wherein the toner is carried on the rotational sleeve by utilizing magnetic forces of the stationary magnet roller and layer thickness regulated by the toner layer thickness regulator before being led to the developing position;

wherein the stationary magnet roller has a three-pole structure constituted by a developing pole located near the developing position and a blade-facing pole and a shield pole of the opposite polarity to the developing pole, whereby a repulsive magnetic field exists near a part of the rotational sleeve between the blade-facing pole and the shield pole; and wherein the blade-facing pole is disposed at a declination angle of about 6 to 15 degrees upstream of the toner layer thickness regulator in the sleeve rotation direction.

3. A developing apparatus comprising:

a developer vessel for containing a toner as a uni-component magnetic developer;

a mixer disposed in the vessel for stirring the toner;

a rotational sleeve accommodating a stationary magnet roller having a plurality of magnetic poles; and a toner layer thickness regulator disposed upstream of a developing position at which an image on a photo-sensitive drum is developed in the sleeve rotation direction;

wherein the toner is carried on the rotational sleeve by utilizing magnetic forces of the stationary magnet roller and layer thickness regulated by the toner layer thickness regulator before being led to the developing position;

wherein the stationary magnet roller has a three-pole structure constituted by:

a developing pole located near the developing position and facing the photo-sensitive drum; and two poles of the opposite polarity to the developing pole, one of the two poles being a blade-facing pole facing the toner layer thickness regulator, the other one of the two poles being a shield pole located downstream of the developing position in the sleeve rotation direction; and wherein the toner having been stirred in the developer vessel is brought in contact with a part of the rotational sleeve between the blade-facing pole and the shield pole;

wherein the blade-facing pole is disposed at a declination angle of about 6 to 15 degrees upstream of the toner layer thickness regulator in the sleeve rotation direction.

4. The developing apparatus according to one of claims 3 and 2, wherein the toner layer thickness regulator is constituted by a magnetic blade, a magnetic force of the same polarity as the blade-forcing pole being applied to the magnetic blade.

5. The developing apparatus according to one of claims 3 and 2, wherein the full-wave width at half maximum of the blade-facing pole with respect to the magnetic flux density peak thereof is about 50 degrees or larger.

6. A developing apparatus comprising:

a developer vessel for containing a toner as a uni-component magnetic developer;

a mixer disposed in the vessel for stirring the toner;

a rotational sleeve accommodating a stationary magnet roller having a plurality of magnetic poles; and a toner layer thickness regulator disposed upstream of a developing position at which an image on a photo-sensitive drum is developed in the sleeve rotation direction;

wherein the toner is carried on the rotational sleeve by utilizing magnetic forces of the stationary magnet roller and layer thickness regulated by the toner layer thickness regulator before being led to the developing position;

wherein the stationary magnet roller has a three-pole structure constituted by a developing pole located near the developing position and a blade-facing pole and a shield pole of the opposite polarity to the developing pole, whereby a repulsive magnetic field exists near a part of the rotational sleeve between the blade-facing pole and the shield pole; and wherein the magnetic flux density of the developing pole is higher than or equal to the magnetic flux density of each of the blade-facing pole and the shield pole.

* * * * *